United States Patent
Elman et al.

(10) Patent No.: US 8,284,907 B2
(45) Date of Patent: *Oct. 9, 2012

(54) AUTOMATED CONVERSATION RECORDING DEVICE AND SERVICE

(75) Inventors: Boris S. Elman, Newton, MA (US); Jesse Hefter, Brookline, MA (US)

(73) Assignee: Verizon Laboratories Inc., Waltham, MA (US)

( * ) Notice: Subject to any disclaimer, the term of this patent is extended or adjusted under 35 U.S.C. 154(b) by 398 days.

This patent is subject to a terminal disclaimer.

(21) Appl. No.: 12/346,284

(22) Filed: Dec. 30, 2008

(65) Prior Publication Data

US 2009/0111437 A1 Apr. 30, 2009

Related U.S. Application Data

(63) Continuation of application No. 09/932,202, filed on Aug. 17, 2001, now Pat. No. 7,502,448.

(51) Int. Cl.
*H04M 1/64* (2006.01)
(52) U.S. Cl. ............... 379/68; 379/88.22; 455/412.1
(58) Field of Classification Search ............ 379/67.1, 379/68, 88.22, 88.16, 88.25, 88.28; 455/412.1, 455/414.1, 413, 456.1
See application file for complete search history.

(56) References Cited

U.S. PATENT DOCUMENTS

| | | | | |
|---|---|---|---|---|
| 5,524,137 A * | 6/1996 | Rhee | | 379/88.01 |
| 5,526,407 A | 6/1996 | Russell et al. | | |
| 5,668,863 A * | 9/1997 | Bieselin et al. | | 379/202.01 |
| 5,982,857 A * | 11/1999 | Brady | | 379/88.19 |
| 5,995,824 A * | 11/1999 | Whitfield | | 455/412.1 |
| 6,029,063 A | 2/2000 | Parvulescu et al. | | |
| 6,069,940 A * | 5/2000 | Carleton et al. | | 379/88.04 |
| 6,072,860 A | 6/2000 | Kek et al. | | |
| 6,222,909 B1 * | 4/2001 | Qua et al. | | 379/88.22 |
| 6,230,214 B1 | 5/2001 | Liukkonen et al. | | |
| 6,233,320 B1 | 5/2001 | Haimi-Cohen | | |
| 6,252,947 B1 * | 6/2001 | Diamond et al. | | 379/88.22 |
| 6,278,772 B1 * | 8/2001 | Bowater et al. | | 379/88.13 |
| 6,298,129 B1 * | 10/2001 | Culver et al. | | 379/202.01 |
| 6,522,727 B1 * | 2/2003 | Jones | | 379/88.23 |
| 6,529,602 B1 * | 3/2003 | Walker et al. | | 380/283 |
| 6,587,871 B1 | 7/2003 | Schrader | | |
| 6,671,567 B1 * | 12/2003 | Dwyer et al. | | 700/94 |
| 7,039,585 B2 * | 5/2006 | Wilmot et al. | | 704/235 |
| 7,965,824 B2 * | 6/2011 | Kovales et al. | | 379/88.23 |
| 2001/0031041 A1 * | 10/2001 | Sun | | 379/67.1 |
| 2002/0006188 A1 | 1/2002 | Onshage et al. | | |
| 2002/0023099 A1 * | 2/2002 | Wendelrup | | 707/200 |
| 2002/0027976 A1 * | 3/2002 | Wilcox et al. | | 379/67.1 |
| 2002/0160751 A1 | 10/2002 | Sun et al. | | |
| 2003/0002632 A1 | 1/2003 | Bhogal et al. | | |
| 2003/0012346 A1 | 1/2003 | Langhart et al. | | |
| 2003/0032447 A1 | 2/2003 | Bulthuis | | |
| 2003/0128820 A1 * | 7/2003 | Hirschberg et al. | | 379/88.14 |
| 2004/0137945 A1 | 7/2004 | Takagi et al. | | |

FOREIGN PATENT DOCUMENTS

WO WO-98/39901 9/1998

* cited by examiner

*Primary Examiner* — Olisa Anwah

(57) ABSTRACT

An apparatus and system for recording and managing conversation data occurring over a wireless network via a wireless communication device includes a data interface that transfers conversation data from the communication device to a storage location and a user interface that allows the user to edit and manage the conversation data. In one embodiment, the communication device includes on-board memory to provide temporary storage of the communication data before it is transferred to a playback device or long-term storage device. The inventive service may include playback and/or editing functions as well as an audio-to-text conversion option.

43 Claims, 5 Drawing Sheets

AUTOMATED CONVERSATION RECORDING DEVICE AND SERVICE

CROSS REFERENCE TO RELATED APPLICATIONS

This application is a continuation of U.S. pat application Ser. No. 09/932,202filed on Aug. 17, 2001which is hereby incorporate by reference in its entirety.

BACKGROUND OF THE INVENTION

1. Field of the Invention

The present invention is related to voice recording, and more particularly to a method and system for recording, storing and retrieving conversations occurring over a wireless communication system.

2. Description of the Related Art

An increasing number of business and personal transactions are conducted over the telephone rather than in written form. This is particularly true for wireless phone users, who tend to conduct business over the phone while traveling. Oral communications are an effective means for efficiently exchanging information, but the substance and detail of the communication can often be lost due to the lack of a written or other tangible record, such as an audio recording. Although note-taking by the conversation participants is an option, some people choose to have their conversations recorded to capture the content of the conversation more accurately and completely.

Currently, video conferences and voice conversations occurring over land lines/wire lines are recorded regularly by individual users. Most answering machines available today also provide a conversation recording function. With respect to wireless devices, voice mail provides one-way recording of a human voice, but there are currently no known devices or services that provide recording of two-way conversations for wireless devices. Further, with respect to both wireless and wire line communication systems, there is currently no device or service that allows recording of conversations in an easily accessible manner so that conversations can be stored, transferred to other storage devices, edited, transcribed to text, and/or archived.

There is a need for a device and service that allows users to easily record, store, retrieve and manage conversations that take place over wireless and wire line communication networks.

SUMMARY OF THE INVENTION

Accordingly, the present invention is directed to an apparatus and system for transmitting, receiving and recording conversation data occurring over a network. One embodiment of the invention is directed to a wireless communication device that has an on-board memory for storing the conversation data in digital format, making the conversation data available for transfer to another storage device, playback, and/or editing. The invention is also directed to a system that provides a recording service having a data interface between the wireless communication device and a storage location for transferring the conversation data from the on-board memory of the wireless communication device. A user interface allows a user to access the conversation data the storage location, wherein the user interface includes at least one of a plurality of data management functions, such as playback function and/or an editing function.

As a result, the invention provides wireless communication device users with the ability to record, play back, organize and edit conversations occurring over the network. In one embodiment, the service also provides users with the option to convert the audio data into text for easier reference and incorporation into other documents. The invention therefore provides a convenient way for users to save and manage conversation data, thereby preserving the content of conversations in a more accurate and convenient manner than any currently known methods.

DETAILED DESCRIPTION OF THE PREFERRED EMBODIMENTS

Figure 1:
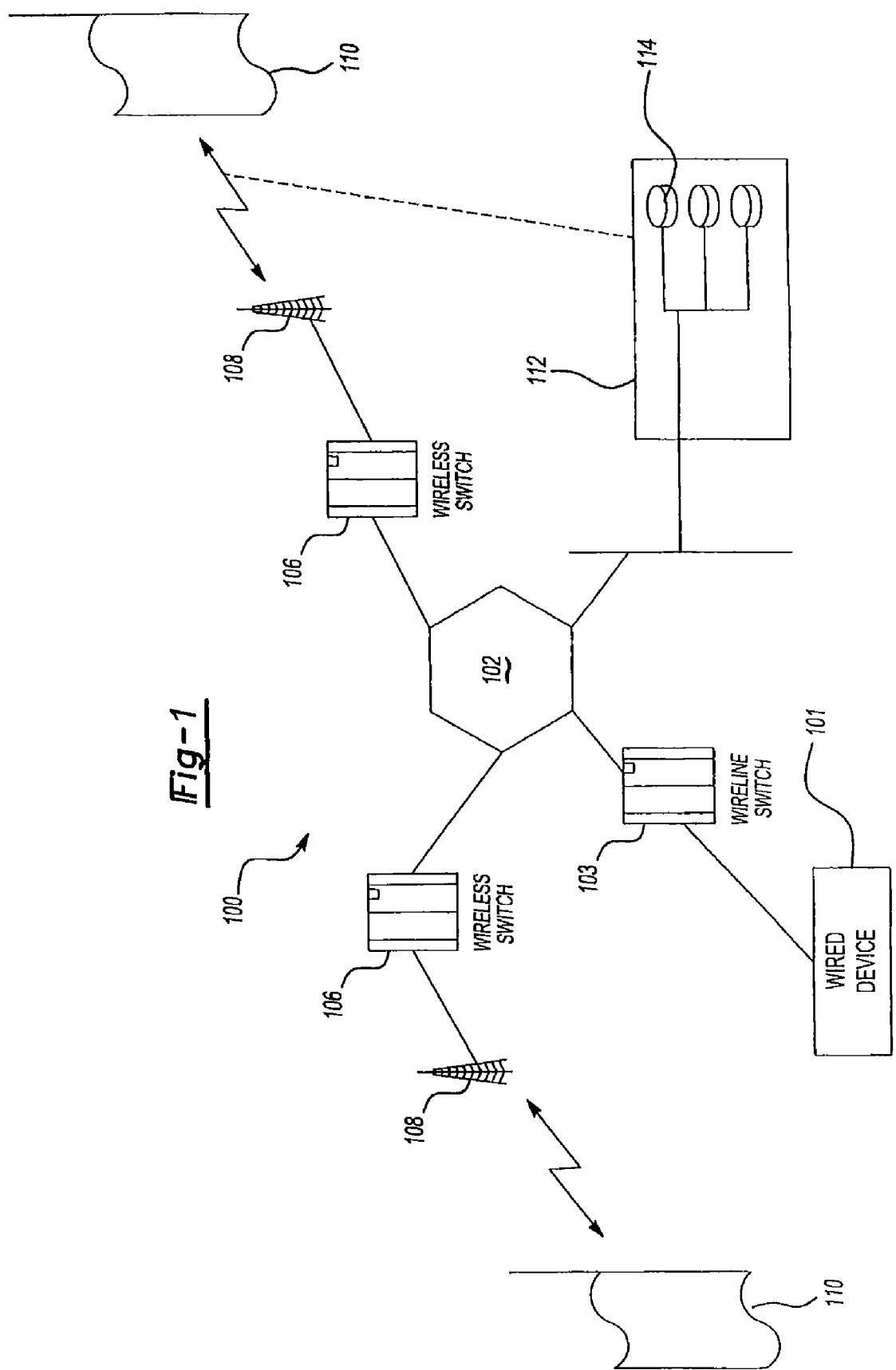
FIG. 1 is a representative diagram of a wireless network in which the invention can be used.

FIG. 1 is a representative diagram of a wireless network in which the inventive device and system can be used. As is known in the art, most of a wireless network 100 is actually a wireline network 102 having a hierarchy of switches 103 that provide telephone service to, for example, a wired telephone device 101. More particularly, a wireless service provider will have connectivity to a central entity that handles all of the phone connections to the normal, land based wireline network 102 in a given region as well as all of the base stations and switches 106 in the wireless network for that region. The switches in the wireline network 102 connect to wireless switches 106 in a wireless network 108, which provide connectivity to one or more wireless devices 110.

One manner in which the inventive service can be executed is by providing a computer system 112 controlled by the service provider and connected to the network 100 for storing conversations from multiple users. The computer system 112 may contain multiple user storage locations 114, or mailboxes, allowing each user to have his or her own mailbox 114 that is not accessible to other users on the same computer system 112. Conversation data are stored in each mailbox 114. Although these computer systems 112 are known in the context of voice mail services, which allow one-way voice recording, there is no service or device that allows recording and storage of two-way conversations. Note that the computer system 112 can tap into the network 100 at either the wire line portion 102 or the wireless position 108 as shown in the Figure by solid and dashed connecting lines, respectively. Because of this flexibility, a wire line company can provide the inventive service to a wireless company, who would in turn sell the service to the end user.

Figure 2:
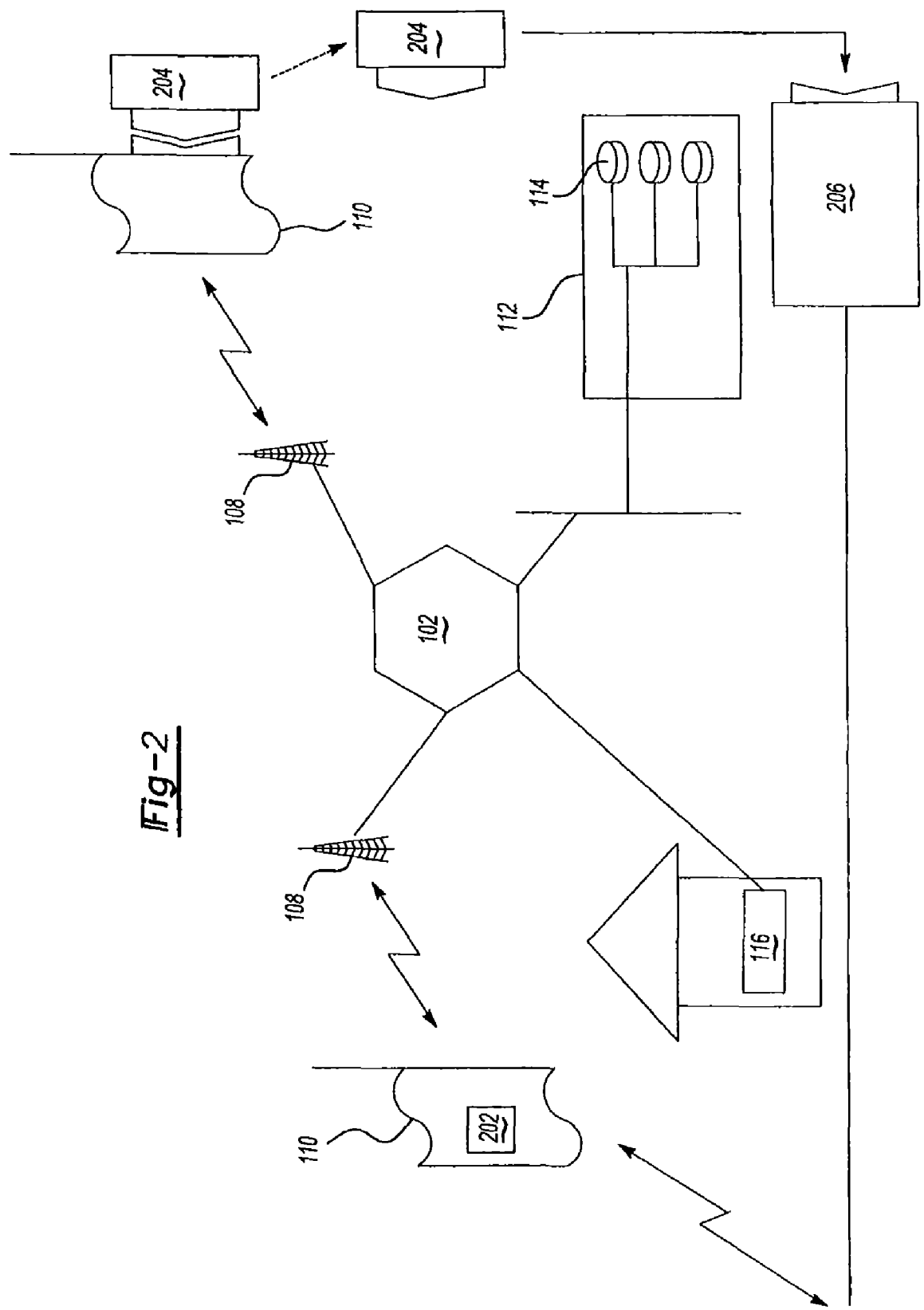
FIG. 2 is a representative diagram of a wireless communication system incorporating one embodiment of the present invention.

FIG. 2 illustrates one manner in which the inventive device and service can be implemented. In this embodiment, the invention is implemented as a wireless communication device 110 that can record a conversation in real-time and store the conversation at least temporarily on an on-board memory 202. Any physical storage device, such as solid-state memory or a hard drive, can be used for the on-board memory 202. The memory 202 preferably contains enough space to store several average-length conversations. Because the conversation is recorded as digital data, the conversation can easily be stored in the on-board memory 202. Alternatively, or in addition to the on-board memory 202, a removable external memory 204 can be coupled to the wireless communication device 110. The removable external memory 204 can be used to supplement the on-board memory 202 or be used as the primary storage location for the communication device 110.

To retrieve the stored conversations from the on-board memory 202 and/or external memory 204, the inventive system offers several options. First, an optional attachment (not shown) to the wireless communication device 110 may be used for record retrieval. More particularly, the attachment can be physically coupled to the wireless communication device 110 to retrieve the records stored in the on-board memory 202 or external memory 204, store the records into long-term memory, play back the recorded communication, and edit or otherwise manage the conversion data. For example, in the case of an on-board memory 202, a data kit or plug-in attachment can be connected to the communication device 110 having an on-board memory 202 to transfer the stored information from the on-board memory 202 to a computer or any other storage media for long-term storage and/or data management. If a removable memory 204 is used, the user can simply remove the memory 204 from the communication device 110 and connect the removable memory 204 to another device 206 for long-term storage or playback (e.g., a computer, a hand held device, phone, etc.).

Note that if the attachment, or even the communication device 110 itself, has wireless networking capabilities, the recorded conversation on the on-board memory 202 can be moved smoothly from the communication device 110 to another storage device by simply placing the two devices in proximity to each other to form the network connection. For example, technologies such as Bluetooth may be incorporated in the communication device to provide conversation data transfer capabilities. Another option is transferring conversation data from one communication device to another communication device by connecting one communication device to the network 100 and then transferring the conversation data between communication devices via the network. As a result, the invention provides flexibility in the manner in which the conversation data are transferred and where the data are stored.

Wireless devices can provide numerous digital services to the user when the user connects to the network 100. In another embodiment, the service provider offers a service where the conversation can be transferred from the on-board memory 202 or external memory 204 over the network 100 to a central, secure computer system 112 that is accessible by the user remotely, such as via the Internet.

Because the transfer is conducted entirely over the network 100 in this particular embodiment, the embodiment does not require the user to physically connect the on-board memory 202 or external memory 204 to any other device or require the on-board memory 202 or external memory 204 to be removed from the communication device 200 to transfer the conversation data in the memory 202, 204 elsewhere for long-term storage or playback. Further, this embodiment provides the user with the option to choose, by initiating a command from the communication device 110, the remote location where the conversation data in the memory 202, 204 is to be sent. For example, as can be seen in FIG. 2, the user may choose to send a given conversation to the service provider's computer system 112, to a personal storage device 116 such as a home computer, or to another communication device via the network 100 simply by selecting an option on the communication device 110, without having to physically move or connect the on-board memory 202 or external memory 204 to any other device to conduct the transfer to the location chosen.

Figure 3:
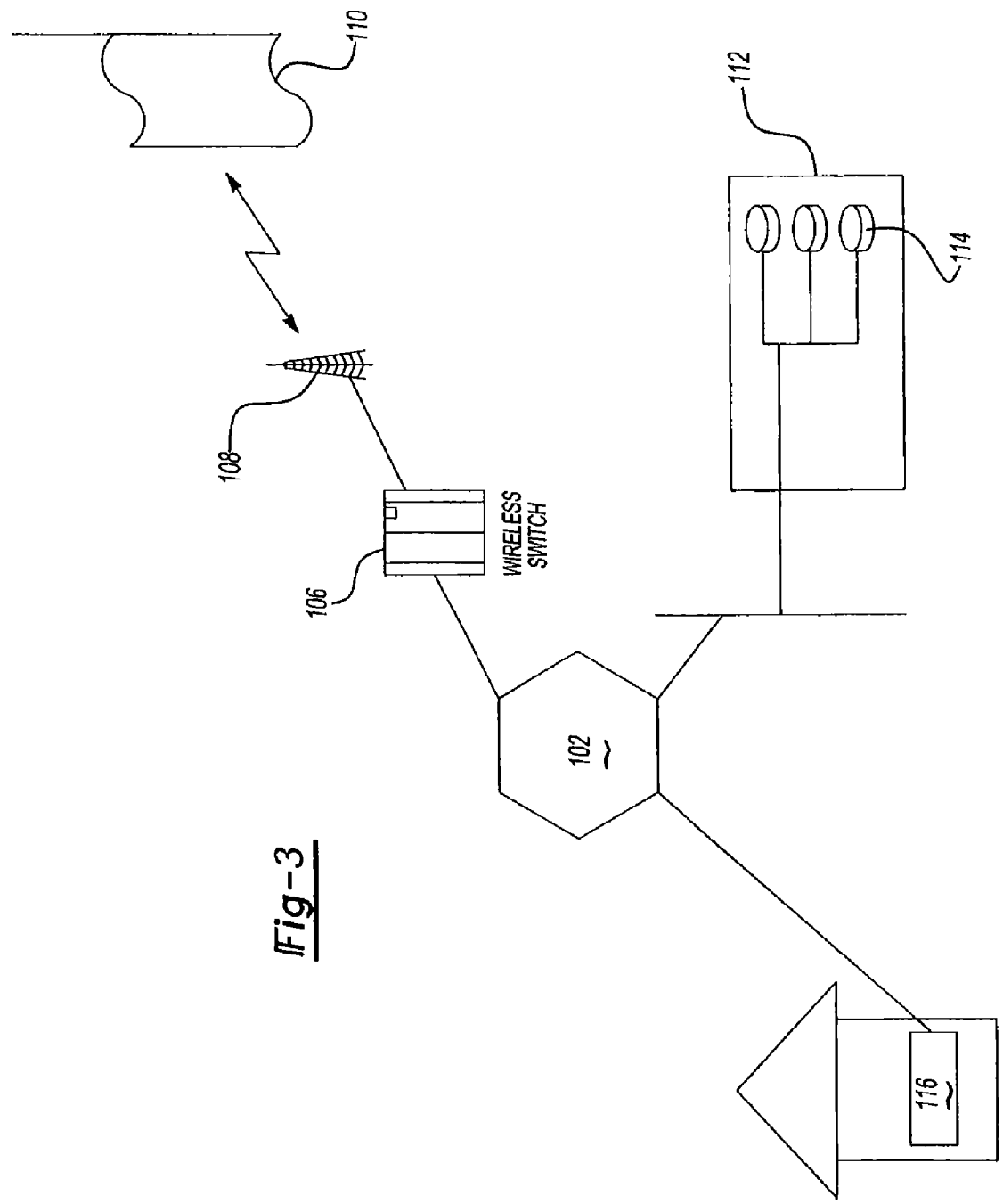
FIG. 3 is a representative diagram of a wireless communication system incorporating another embodiment of the present invention.

FIG. 3 illustrates another way in which the invention can be implemented. In this embodiment, the invention is implemented as a record-keeping service that can be provided by the communication service provider to the end user to allow the user to record conversations from a wireless device having the inventive service activated. The user can choose whether to record only selected conversations or all conversations conducted through the wireless communication device 110. The choice can be made before, after, or during the conversation. Any of these choices can be selected as a default setting. When a given conversation has ended, the service may provide the user with the option to save the conversation for a predetermined period of time on the service provider's computer system 112 or at some other location designated by the user, such as a personal storage device 116. The service also preferably provides the user with the option of secure access and downloading of conversations from the service provider's computer system 112 to various devices, including any communication device or computer.

For example, if a user wishes to transfer conversation data to another communication device using his own communication device 110, without having to locate a computer or terminal to conduct the transfer, the user can connect his own communication device 110 to the network 100, access conversation data under his control stored on the computer system 112 or personal storage device 116, select a desired conversation, and then download the selected conversation to the on-board or external memory of the other communication device via the network 100. Similarly, in the example shown in FIG. 3, a user can have conversation data sent directly to the personal storage device 116 through the wireless switch 106 and wireline network 102, bypassing the service provider's storage device 112 completely. As a result, the above-described embodiments eliminate the need for a board memory or removable memory on the wireless communication device 110 altogether.

Figure 4:
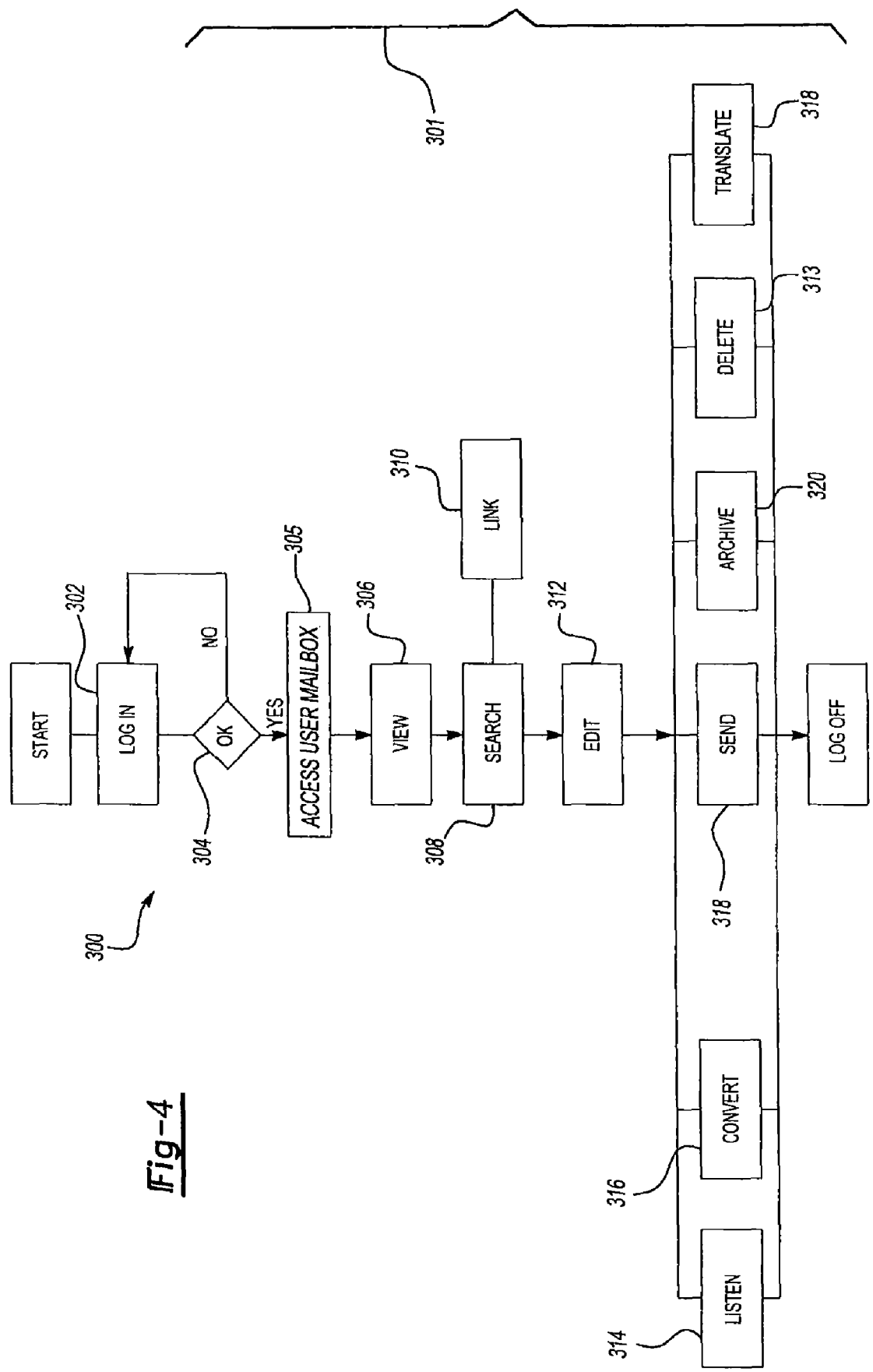
FIG. 4 is a representative diagram of a user interface in an embodiment of the present invention.

If the conversation is transferred and recorded on a central computer system 112 or other system that is accessible to the user remotely, the invention provides an interface that allows the user to manage and control the playback and format of the stored conversation. FIG. 4 is a functional block diagram describing a possible user interface 300 that provides the user with options for interacting with and managing the conversation data through a plurality of data management functions 301. After the user enters a username and password at step 302, the system determines at step 304 whether the entered information is valid. If it is, the user is given access to his own user storage location 114 on the computer system 112 and is allowed to view his stored conversation data at step 306. The user is also given the option to search the conversation data at step 308 to locate, for example, specific words appearing in a conversation and to link related conversations at step 310. The search function can be provided using software methods known in the art, such as full string searching, context sensitive searching, keyword-based searching, or proximity methods. The service may offer the sentences or paragraphs in which the search terms appear to the user as a text e-mail, allowing the user to cut and paste the text information into another text document. The user interface 300 also provides an editing option 312 so that the user can edit conversations. Editing allows the user to organize the conversation data further by saving only portions of conversations that the user deems important. Preferably, both audio and text conversation data can be edited by the user. Of course, the user interface 300 also provides the option to delete a conversation altogether at step 313.

In addition to the data management functions 301 noted above, the user interface 300 may provide additional choices for controlling and managing the conversation data. For example, the user interface can include a listening or play function 314 so that the user can listen to any stored conversation or even selected portions of a stored conversation. The user may be given the option of converting any portion of the conversation or the entire conversation to text at step 316, to automatically transcribe the conversation into text and make the conversation available for text searching. The user may also choose to send conversation data (as an audio file or as a text document) via electronic mail, fax, or other means at step 318. In one embodiment, each user would be assigned a user folder where the conversation data are stored by date, subject, or other selected criteria. All of these functions for organizing, searching, linking and otherwise managing the conversation data can be considered data management functions.

Note that the text can be in any language supported by the available technology. Further, if desired, the inventive system can provide a service that translates the text back into speech in any desired language or at least provide a background translation of the conversation in the selected language at step 318. These translation functions, as well as the management functions described above, can be implemented using any known software.

The ability to manage the content of the recorded conversations and their corresponding text is particularly useful for users who need to record and manage a large number of conversations daily. For example, people who work in sales and marketing may have twenty, thirty or more conversations daily with numerous people, making it difficult to track the substance of each conversation and what was said to whom. Providing the ability for the user to manage the conversation content via a user interface allows the user to organize the conversation data in a manner that would simplify information retrieval. In essence, the invention may include a service that acts like a document management program for managing conversation data in both audio and text form.

A key difference between the first and second embodiments is that the second embodiment does not require the user to attach an on-board memory 202 or removable 204 to the communication device 110 or modify the communication device 110 in any way, nor does it require the user to connect the communication device 110 to any other device to transfer the conversation information to a location where the audio data can be managed by the user. Instead, the second embodiment allows the user to record and manage conversations automatically by simply subscribing for the service with the service provider. In short, the second embodiment provides the user with the ability to record and store conversation data at a selected storage site, to playback and manage the conversation data, search the conversation data, and convert the conversation to text, all without purchasing any additional equipment or modifying the communication device 110.

As a practical matter, the service provider may wish to limit storage of conversations to those that have occurred less than two months ago and thereby prevent storage costs from increasing. Alternatively, the service provider may use different criteria, such as total storage space. If the user wishes to store conversations for a longer period of time on the service provider's storage device rather than on a personal storage device, the service provide may offer the option of archiving conversations for a longer period (e.g., six months to a year) at step 320. The archiving service 320 provides the service provider with an additional revenue stream while providing users with the option to continue storing conversations on the service provider's computer system 112 rather than undergoing the inconvenience of transferring the conversations to a secondary location (e.g., a personal computer, other wireless device, etc.) as described above. The inventive service provides the user with the end-to-end capability to control the manner in which conversation data are captured, stored, managed, and organized. Further, by allowing storage and archiving at a central computer system location that is accessible remotely, the user can access and manage conversations from any location where there is Internet access.

Figure 5:
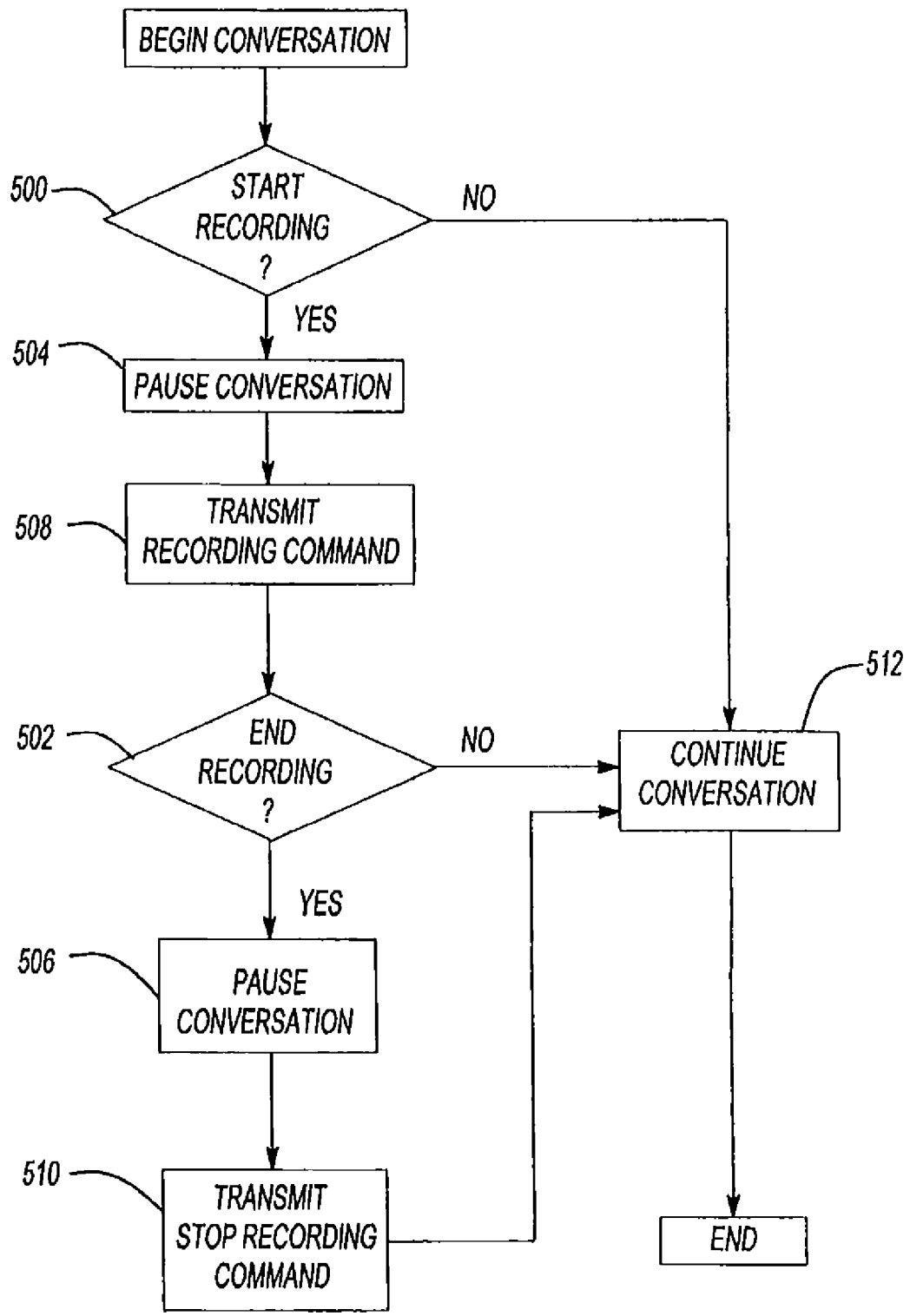
FIG. 5 is a representative diagram of yet another embodiment of the present invention.

FIG. 5 illustrates another service option in the present invention. In this embodiment, the inventive device and service may provide further customization of conversation recording by allowing the user to activate and de-activate the recording function in the middle of a conversation. This option can be provided via an on-board interface that is controlled via the communication device 110 itself so that the user can control these options in real-time as the conversation is taking place. For example, if a user wanted to record only selected portions of a conversation, the inventive service provides the option to start recording (step 500) and stop recording (step 502) at will during the conversation in real time. In practice, this may involve the speakers pausing for a moment during a conversation (steps 504 and 506) to allow the user to transmit commands starting or stopping the recording process (steps 508 and 510) before continuing the conversation (step 512). When the conversation is eventually played back, the service provider may insert an optional message into the skipped portion such as "content skipped per user's request". Another example is if the majority of a conversation is not considered by the user important enough to be recorded. If the user obtains contact information, such as a phone number, that he would like to save, the user can simply initiate a recording command, such as by pressing a button or speaking a command designated to begin recording, record the phone number as it is being recited by the other speaker, then initiating another command to stop the recording and continue with the unrecorded conversation.

Another option for removing portions of conversations that the user does not want to be recorded is offering the option to play back and edit the conversation directly over the communication device 110 after the conversation has been completed. This option may be more convenient for the user if the user does not have easy remote access to the service provider's computer system 112. With this option, the inventive service provides the user with the capability to play back the conversation and edit it through selected commands. For example, a user may choose to play back a conversation immediately after it has concluded and choose to erase portions of it before storing it on the service provider's computer system 112 or elsewhere.

As a result, the record keeping service and device according to the present invention can be offered by communication service providers to allow users to record, access, and manage conversations occurring over the communication network. The invention can be implemented in, but is not limited to, home use, business use, and service provider use. By providing an automated conversation recording and record keeping service and device for recording conversations over both wire line and wireless devices, the invention is particularly convenient for those who conduct much of their business over the phone because the service and device ensures that the content of the conversation is completely memorialized, without introducing the inaccuracies that manual note-taking or reliance on memory would introduce.

While the invention has been specifically described in connection with certain specific embodiments thereof, it is to be understood that this is by way of illustration and not of limitation, and the scope of the appended claims should be construed as broadly as the prior art will permit.

What is claimed is:

1. A method, comprising:
    recording at least a portion of a two-way conversation between a user of a wireless communication device and a remote party;
    storing the two-way conversation as data in a digital format;
    providing a user interface that includes a plurality of data management functions, the plurality of data management functions including functions for playing the stored two-way conversation, deleting the stored two-way conversation, searching the two-way conversation, linking stored two-way conversations, and transferring the two-way conversation to a remote location;
    searching a plurality of said stored two-way conversations to locate at least one search term appearing in the plurality of said stored two-way conversations; and
    linking conversations in the plurality of said stored two-way conversations determined to be related according to the search.

2. The method of claim 1, further comprising converting the two-way conversation from audio data to text data.

3. The method of claim 1, the plurality of data management functions further including functions for archiving the stored two-way conversation.

4. The method of claim 1, the plurality of data management functions further including functions for editing the stored two-way conversation, and further comprising editing the two-way conversation by the wireless communication device, after the two-way conversation has been completed and before transferring the two-way conversation to the remote location, to remove at least one portion of the two-way conversation.

5. The method of claim 1, wherein the two-way conversation is transferred as at least one of an audio file and a text document.

6. The method of claim 1, the plurality of data management functions further including a function for translating the two-way conversation from a first language to a second language.

7. The method of claim 6, further comprising translating the two-way conversation from the first language to the second language by:
    converting the stored two-way conversation to text data in the first language;
    translating the text data into the second language; and
    converting the translated text data into audio data in the second language.

8. The method of claim 1, wherein the remote location includes at least one of a personal storage device, a wireless communication device, and a personal computer.

9. A system, comprising:
    a wireless communication network;
    a wireless communication device communicatively coupled to the wireless communication network; and
    a computing system communicatively coupled to the wireless communication network, the computing system configured to
        store at least a portion of a two-way conversation between a user of the wireless communication device and a remote party, wherein the two-way conversation is stored as data in a digital format,
        provide a user interface that includes a plurality of data management functions, the plurality of data management functions including functions for playing the stored two-way conversation, deleting the stored two-way conversation, searching the two-way conversation, linking stored two-way conversations, and transferring the two-way conversation to a remote location,
        search a plurality of the stored two-way conversations to locate at least one search term appearing in the plurality of the stored two-way conversations, and
        link conversations in the plurality of the stored two-way conversations determined to be related according to the search.

10. The system of claim 9, the wireless communication device further configured to record the two-way conversation, and transfer the recorded two-way conversation to the computing system.

11. The system of claim 9, the computing system further configured to:
    receive a request from the wireless communication device to record the two-way conversation, and
    respond to the request by recording the two-way conversation.

12. The system of claim 9, the plurality of data management functions further including functions for converting the two-way conversation from audio data to text data.

13. The system of claim 9, the plurality of data management functions further including functions for archiving the stored two-way conversation.

14. The system of claim 9, the plurality of data management functions further including functions for editing the stored two-way conversation.

15. The system of claim 9, wherein the two-way conversation is transferred as at least one of an audio file and a text document.

16. The system of claim 9, the computing system further configured to transfer the two-way conversation to a remote location via electronic mail.

17. The system of claim 9, the plurality of data management functions further including a function for translating the two-way conversation from a first language to a second language.

18. The system of claim 17, the computing system further configured to translate the two-way conversation from a first language to a second language by:
    converting the stored two-way conversation to text data in the first language;
    translating the text data into the second language; and
    converting the translated text data into audio data in the second language.

19. The system of claim 9, wherein the remote location includes at least one of a personal storage device, a wireless communication device, and a personal computer.

20. The system of claim 9, the computing system further configured to provide multiple user storage locations such that one of said user storage locations corresponds with an individual user.

21. A method, comprising:
    receiving a request to start recording a two-way conversation between a user of a wireless communication device and a remote party;
    recording, responsive to the start request, at least a portion of the two-way conversation;
    storing the recorded portion of the two-way conversation as data in a digital format;
    providing a user interface that includes a plurality of data management functions, the plurality of data management functions including functions for playing the stored two-way conversation, deleting the stored two-way conversation, searching the two-way conversation, linking the stored two-way conversation to at least one other two-way conversation, and transferring the linked two-way conversation to a remote location;

searching a plurality of stored two-way conversations to locate at least one search term appearing in the plurality of stored two-way conversations; and linking conversations in the plurality of stored two-way conversations determined to be related according to the search.

22. The method of claim 21, further comprising converting the two-way conversation from audio data to text data.

23. The method of claim 21, the plurality of data management functions further including functions for archiving the stored two-way conversation and editing the stored two-way conversation.

24. The method of claim 21, wherein the two-way conversation is transferred as at least one of an audio file and a text document.

25. The method of claim 21, further comprising transferring the two-way conversation to a remote location via electronic mail.

26. The method of claim 21, the plurality of data management functions further including a function for translating the two-way conversation from a first language to a second language.

27. The method of claim 26, further comprising translating the two-way conversation from the first language to the second language by:
converting the stored two-way conversation to text data in the first language;
translating the text data into the second language; and
converting the translated text data into audio data in the second language.

28. The method of claim 21, wherein the remote location includes at least one of a personal storage device, a wireless communication device, and a personal computer.

29. The method of claim 1, further comprising offering at least one of a sentence and a paragraph in which the at least one search term appears to the user as text data.

30. The method of claim 1, further comprising:
transcribing at least a portion of the plurality of said stored two-way conversations into text data; and
making the transcribed two-way conversations available for textual searching.

31. The system of claim 9, the computing system further configured to offer at least one of a sentence and a paragraph in which the at least one search term appears to the user as text data.

32. The system of claim 9, the computing system further configured to:
transcribe at least a portion of the plurality of the stored two-way conversations into text data; and
make the transcribed two-way conversations available for textual searching.

33. The method of claim 4, further comprising linking the stored two-way conversation to at least one other two-way conversation, and then transferring the linked two-way conversation to the remote location.

34. A method, comprising:
recording at least a portion of a conversation between a user of a communication device and a remote party;
storing the conversation as data in a digital format;
providing a user interface that includes a plurality of data management functions, the plurality of data management functions including functions for playing the stored conversation, deleting the stored conversation, searching the conversation, linking stored conversations, and transferring the conversation to a remote location;
searching a plurality of said stored conversations to locate at least one search term appearing in the plurality of said stored conversations; and
linking conversations in the plurality of said stored conversations determined to be related according to the search.

35. The method of claim 34, further comprising converting the conversation from audio data to text data.

36. The method of claim 34, the plurality of data management functions further including functions for archiving the stored conversation.

37. The method of claim 34, the plurality of data management functions further including functions for editing the stored conversation, and further comprising editing the conversation by the communication device, after the conversation has been completed and before transferring the conversation to the remote location, to remove at least one portion of the conversation.

38. The method of claim 34, wherein the conversation is transferred as at least one of an audio file and a text document.

39. The method of claim 34, the plurality of data management functions further including a function for translating the conversation from a first language to a second language.

40. The method of claim 39, further comprising translating the conversation from the first language to the second language by:
converting the stored conversation to text data in the first language;
translating the text data into the second language; and
converting the translated text data into audio data in the second language.

41. The method of claim 34, wherein the remote location includes at least one of a personal storage device, a wireless communication device, and a personal computer.

42. The method of claim 34, further comprising offering at least one of a sentence and a paragraph in which the at least one search term appears to the user as text data.

43. The method of claim 34, further comprising:
transcribing at least a portion of the plurality of said stored conversations into text data; and
making the transcribed conversations available for textual searching.

* * * * *